(12) United States Patent
Ruile et al.

(10) Patent No.: US 8,393,214 B2
(45) Date of Patent: Mar. 12, 2013

(54) ROTATING MOTION SENSOR

(75) Inventors: Werner Ruile, Munich (DE); Anton Leidl, Hohenbrunn (DE)

(73) Assignee: EPCOS AG, Munich (DE)

( * ) Notice: Subject to any disclaimer, the term of this patent is extended or adjusted under 35 U.S.C. 154(b) by 413 days.

(21) Appl. No.: 12/438,251

(22) PCT Filed: Aug. 7, 2007

(86) PCT No.: PCT/DE2007/001414
§ 371 (c)(1),
(2), (4) Date: Feb. 20, 2009

(87) PCT Pub. No.: WO2008/022619
PCT Pub. Date: Feb. 28, 2008

(65) Prior Publication Data
US 2009/0255337 A1    Oct. 15, 2009

(30) Foreign Application Priority Data

Aug. 23, 2006 (DE) .................. 10 2006 039 515

(51) Int. Cl.
*G01P 15/00* (2006.01)
(52) U.S. Cl. .................................. 73/514.12
(58) Field of Classification Search .............. None
See application file for complete search history.

(56) References Cited

U.S. PATENT DOCUMENTS

| | | | |
|---|---|---|---|
| 5,094,108 A * | 3/1992 | Kim et al. ................. | 73/627 |
| 5,351,022 A | 9/1994 | Ruile et al. | |
| 5,365,206 A | 11/1994 | Machui et al. | |
| 5,379,010 A | 1/1995 | Ruile et al. | |
| 5,621,364 A | 4/1997 | Ruile et al. | |
| 5,656,778 A * | 8/1997 | Roszhart .................. | 73/504.04 |
| 5,691,698 A | 11/1997 | Scholl et al. | |
| 5,699,026 A | 12/1997 | Kurp et al. | |
| 5,948,982 A * | 9/1999 | Woodruff et al. .......... | 73/514.29 |
| 5,966,008 A | 10/1999 | Maier et al. | |
| 6,003,370 A | 12/1999 | Yukawa et al. | |
| 6,032,531 A * | 3/2000 | Roszhart .................. | 73/504.04 |
| 6,084,503 A | 7/2000 | Ruile et al. | |
| 6,121,892 A | 9/2000 | Reindl et al. | |

(Continued)

FOREIGN PATENT DOCUMENTS

| | | |
|---|---|---|
| JP | 6-281465 | 10/1994 |
| JP | 9-318360 | 12/1997 |

(Continued)

OTHER PUBLICATIONS

International Search Report for PCT/DE2007/001414.

(Continued)

*Primary Examiner* — Harshad R Patel
(74) *Attorney, Agent, or Firm* — Fish & Richardson P.C.

(57) ABSTRACT

A rotating motion sensor includes at least one electroacoustic resonator to stimulate a surface acoustic wave. The at least one electroacoustic resonator is configured so that rotation of the at least one electroacoustic resonator about an axis of rotation causes a change in resonance frequency of the at least one electroacoustic resonator. The at least one electroacoustic resonator includes oscillating structures configured to oscillate in a first direction that is a direction of propagation of the surface acoustic wave and/or a second direction that is transverse to the direction of propagation of the surface acoustic wave.

19 Claims, 2 Drawing Sheets

U.S. PATENT DOCUMENTS

| | | | |
|---|---|---|---|
| 6,186,005 B1 | 2/2001 | Leidl et al. | |
| 6,223,588 B1 * | 5/2001 | Burgass et al. | 73/53.01 |
| 6,237,414 B1 | 5/2001 | Yukawa et al. | |
| 6,420,946 B1 | 7/2002 | Bauer et al. | |
| 6,543,274 B1 * | 4/2003 | Herrmann et al. | 73/32 A |
| 6,556,146 B1 | 4/2003 | Ruile et al. | |
| 6,677,696 B1 | 1/2004 | Ruile | |
| 6,774,645 B1 | 8/2004 | Leidl et al. | |
| 6,847,271 B2 | 1/2005 | Korden et al. | |
| 6,948,332 B2 | 9/2005 | Lee et al. | |
| 7,057,478 B2 | 6/2006 | Korden et al. | |
| 7,065,331 B2 | 6/2006 | Korden et al. | |
| 7,170,372 B2 | 1/2007 | Ruile et al. | |
| RE39,538 E | 4/2007 | Bauer et al. | |
| 7,262,676 B2 | 8/2007 | Ruile et al. | |
| 7,304,553 B2 | 12/2007 | Bauer et al. | |
| 7,345,409 B2 | 3/2008 | Leidl et al. | |
| 7,411,291 B2 | 8/2008 | Baier et al. | |
| 7,449,812 B2 | 11/2008 | Hauser et al. | |
| 7,459,991 B2 | 12/2008 | Ruile et al. | |
| 7,900,512 B2 * | 3/2011 | Kano et al. | 73/504.01 |
| 2003/0167841 A1 | 9/2003 | Varadan et al. | |
| 2004/0033794 A1 | 2/2004 | Korden et al. | |
| 2004/0104789 A1 | 6/2004 | Korden et al. | |
| 2004/0247153 A1 | 12/2004 | Ruile et al. | |
| 2005/0012570 A1 | 1/2005 | Korden et al. | |
| 2005/0174014 A1 | 8/2005 | Korden et al. | |
| 2005/0212620 A1 | 9/2005 | Bauer et al. | |
| 2006/0076852 A1 | 4/2006 | Ruile et al. | |
| 2006/0103486 A1 | 5/2006 | Ruile et al. | |
| 2006/0158061 A1 | 7/2006 | Hauser et al. | |
| 2006/0175639 A1 | 8/2006 | Leidl et al. | |
| 2006/0284307 A1 | 12/2006 | Baier et al. | |
| 2007/0241841 A1 | 10/2007 | Hauser et al. | |
| 2007/0296306 A1 | 12/2007 | Hauser et al. | |
| 2007/0296513 A1 | 12/2007 | Ruile et al. | |
| 2008/0012450 A1 | 1/2008 | Meister et al. | |
| 2008/0028855 A1 | 2/2008 | Kano et al. | |
| 2008/0094150 A1 | 4/2008 | Meister et al. | |
| 2008/0247585 A1 | 10/2008 | Leidl et al. | |
| 2008/0252396 A1 | 10/2008 | Ruile et al. | |
| 2008/0253056 A1 | 10/2008 | Leidl et al. | |
| 2008/0266024 A1 | 10/2008 | Ruile et al. | |
| 2008/0267431 A1 | 10/2008 | Leidl et al. | |
| 2008/0292127 A1 | 11/2008 | Ruile et al. | |
| 2008/0297277 A1 | 12/2008 | Meister et al. | |
| 2009/0001553 A1 | 1/2009 | Pahl et al. | |
| 2009/0011554 A1 | 1/2009 | Baier et al. | |
| 2011/0048135 A1 * | 3/2011 | Caron | 73/633 |

FOREIGN PATENT DOCUMENTS

| | | |
|---|---|---|
| JP | 2000-171255 | 6/2000 |
| JP | 2005-77290 | 3/2005 |
| WO | WO00/79217 | 12/2000 |

OTHER PUBLICATIONS

Written Opinion for PCT/DE2007/001414.

Fang, Huiyu et al "Surface Acoustic Waves Propagating over a Rotating Piezoelectric Half Space" IEEE Transactions on Ultrasonics, Ferroelectrics and Frequency Control, vol. 48, No. 4, Jul. 2001 pp. 998-1004.

Zhou You-He et al. "Effects of Coriolis Force and Centrifugal Force on Acoustic Waves Propagating Along the Surface of a Piezoelectric Half Space" Z. Angew. Math. Phys. 52 (2001) pp. 950-965.

Kurosawa M. et al "A Surface Acoustic Wave Gyro Sensor" Sensors and Actuators 66, 1998, pp. 33-39 XP 002458803.

Sato, K. et al. "Finite Element Method Simulation of Double-Ended Tuning-Fork Quartz Resonator for Application to Vibratory Gyro-Sensor" The Jpn J. Appl Phys., vol. 42, 2003, pp. 3115-3119, Part 1, No. 5B, May 2003.

Shaw, M. et al "Improving the Process Capability of SU-8" Microstructure Technol 10 (2003) 1-6 (presented at the 4$^{th}$ International Workshop on High Aspect Ratio Microstructure Technology HARMST Jun. 2001).

Sugizaki, G. et al "Motion Characteristics Measurement of Rotating Object Using Surface Acoustic Wave Oscillator" Japan J. Applied Phys, vol. 32, Part 1, No. 9B, Sep. 1993, pp. 4237-4240.

Suh W.D. et al "Design Simulation and Testing of ITD-Based MEMS Gyroscope" Smart Structure and Materials 2001: Smart Electronics and MEMS, Proc. of SPIE vol. 4334 (2001).

Varadan V. K. et al "High Sensitive and Wide Dynamic Range Navigation Microsystem on a Single Chip" Proc of SPIE, vol. 4236, 2001, pp. 134-140.

Wood R. C. et al "Evaluation of a Novel Surface Acoustic Wave Gyroscope" IEEE Transactions on Ultrasonics, Ferroelectrics and Frequency Control, vol. 49, No. 1, Jan. 2002 p. 136-141.

English Translation of International Preliminary Report on Patentability in Application No. PCT/DE2007/001414, dated Mar. 17, 2009.

Varadan V. K., et al.: "Hybrid MEMS-IDT based accelerometer and gyroscope in a single chip".Proceedings of SPIE vol. 4334, "Smart Structure and Materials 2001: Smart Electronics and MEMS", 2001, pp. 119-128.

English translation of German Office Action in Application No. 10 2006 039 515.8-54, dated Apr. 12, 2011.

Machine Translation of Japanese Publication No. 6-281465 (Pub. Oct. 1994).

Machine Translation of Japanese Publication No. 2005-077290 (Pub. Mar. 2005).

Machine Translation of Japanese Publication No. 9-318360 (Pub. Dec. 1997).

Machine Translation of Japanese Publication No. 2000-171255 (Pub. Jun. 2000).

Notification of Reasons for Rejection in Japanese Application No. 2009-524895, dated Mar. 13, 2012 (w/English translation).

* cited by examiner

ROTATING MOTION SENSOR

BACKGROUND

A rotating motion sensor, which is also called a gyro sensor, is described in Jpn. J. Appl. Phys. Vol. 42 (2003), pp. 3115-3319. Another sensor is described in U.S. Pat. No. 6,237,414 B1.

SUMMARY

Described herein is a rotating motion sensor with at least one electroacoustic resonator, in which a surface acoustic wave can be stimulated. Rotation of the resonator about an axis of rotation causes a change of the resonance frequency of the resonator.

Rotation of the resonator about the axis of rotation gives rise to a change in wave propagation and to a change of the propagation velocity of the wave, which results in a change of the resonance frequency.

The change of the wave propagation velocity leads to a change of the resonance frequency of the resonator. The frequency change can be measured precisely and also without great circuitry costs. The value of the rotary velocity can be determined from such a measurement.

A rotating motion sensor that operates with surface waves may have a small size.

The sensor effect (gyro effect) is based on the fact that a Coriolis force acts on an object that moves in a rotating system. The Coriolis force is directed perpendicular to the linear velocity of the object and to the rotary velocity of the system.

The rotating motion sensor can be used, for example, in the automotive field or for cameras. The rotating motion sensor can be used to support navigation systems.

The resonator has an arrangement of electrode strips that are arranged in parallel on a piezoelectric substrate. The electrode strips may be alternatingly connected to two bus bars. In this way, a transducer is formed. The resonator can have two acoustic reflectors, between which (in the direction of wave propagation) the transducer can then be arranged. Each reflector may have reflector strips that can be formed essentially like the electrode strips and positioned with the same periodicity.

The rotating motion sensor may include oscillating structures that are capable of oscillation in the direction of wave propagation. The oscillating structures may also be capable of oscillation in a transversal direction. The direction perpendicular to the direction of wave propagation, and in the lateral plane in which the wave propagates, is the transversal direction.

The oscillating structure is caused to oscillate by the deflection of atoms on the surface as the surface wave passes through. In each case, according to the wave mode, the oscillating structure can oscillate like a Rayleigh wave in the direction of wave propagation or like a shear wave in the transversal direction. When the sensor rotates, the Coriolis force acts on the oscillating structure, which oscillates in the coordinate system of the sensor, so that there arises an additional oscillating component that is directed perpendicularly to the original direction of oscillation and to the axis of rotation.

It is assumed in the following that, in the rotation of the sensor, the axis of rotation is directed along the normal to the surface. If the original oscillation of the oscillating structure takes place in the direction of wave propagation, an oscillation component in the transversal direction will arise when the sensor rotates. If the original oscillation of the oscillating structure takes place in the transversal direction, an oscillation component in the direction of wave propagation will arise when the sensor rotates.

The oscillation component resulting from the Coriolis force causes a change of velocity of the acoustic wave. In addition, this oscillation component affects the conditions of reflection of the wave in the resonator.

The sensor effect of the relevant oscillating structure is dependent on its properties. The properties of the oscillating structure include its material composition and geometric parameters, such as its height and lateral measurements—the width and length.

At least a portion of the oscillating structures is arranged in the transducer region, i.e., in the region in which the wave primarily propagates. Another part of the oscillating structures can, however, be arranged in the region of the reflector.

The oscillating structures can be formed by electrode strips or reflector strips with particularly large aspect ratio, i.e., the ratio of the height to wavelength. The height of the electrode and reflector strips can be, for example, at least one wavelength. The height of the electrode and reflector strips can also be two or more wavelengths. The taller the oscillating structures are, the greater the gyro effect will be. Sufficiently tall oscillating structures can be caused to oscillate through the motion of the surface in an advantageous placement in the resonator that will be explained below.

The oscillating structures may be tower-like. This means that the height of the oscillating structure exceeds its width or length. The height may be at least three times the width measured in the direction of wave propagation.

The oscillating structures in each case may have a height of at least $\lambda$, where $\lambda$ is the wavelength of an acoustic wave that can be stimulated in the transducer. The width of the oscillating structures measured in the direction of wave propagation may be a maximum of a quarter wavelength, which usually corresponds to the width of the electrode strips. The transversal length, and thus the length of the oscillating structures measured in the transversal direction, may be a maximum of $2\lambda$. The oscillating structures may extend in the transversal direction, i.e., their transversal length exceeds the width.

The acoustic wave that can be stimulated in the resonator can be a shear wave, a Raleigh wave or leaky wave. In the case of a shear wave, deflection of atoms takes place essentially perpendicularly to the direction of wave propagation. In the case of a Rayleigh wave, deflection of substrate atoms takes place in the direction of the height and in the direction of wave propagation. The deflection of atoms in the case of the leaky wave essentially takes place perpendicular to the direction of wave propagation.

The maximum deflection of atoms, which leads to antinodes, usually takes place (with periodically arranged electrode strips that have the same widths) roughly in the middle of the electrode strips. The wave nodes, on the other hand, lie between the electrodes.

The greater the amplitude of the original oscillation, the greater the amplitude of the oscillation perpendicular to it that is generated by the gyro effect, and thus the greater the useful effect will be. This is why the length of the oscillating structures—in each case according to the surface wave mode utilized in the resonator—is chosen so that maximally large oscillation can be achieved.

Deflection of atoms in the case of a shear wave takes place essentially perpendicular to the direction of wave propagation. For this reason, the oscillating structures also oscillate perpendicularly to the direction of wave propagation, i.e., parallel to the electrode strips—in the absence of rotation of the sensor. If there is rotation about a surface normal, the Coriolis force acts on the oscillating structure and generates an additional oscillation component in a direction perpendicular thereto, thus in the direction of wave propagation. In the case of the shear wave, the oscillating structures may be positioned on the electrode strips, since the maximum shift of the surface atoms takes place there, and thus the strongest oscillation amplitude in the transversal direction can be achieved. Since the oscillation amplitude in the perpendicular direction thereto, which is determinative for the sensor effect, can also be magnified through this, it is possible to enhance the sensor effect.

In the case of a Rayleigh wave, positioning of the oscillating structures on the electrode strips may also be used, since the strongest oscillation amplitude in the direction of wave propagation can be achieved at this point. Rotation of the sensor about a surface normal, as a consequence of the Coriolis force, causes additional oscillation of the oscillating structures perpendicular to the original direction of oscillation, and an oscillation component arises parallel to the electrodes. In this case as well, the propagation velocity and reflection conditions for the surface wave can be affected by the Coriolis effect.

Positioning of the oscillating structures between the electrode strips is also possible.

The oscillating structures together can form an oscillating array. Several oscillating structures in succession in the transversal direction, for example, can form a row. Several successive oscillating structures in the direction of wave propagation can form a column. The oscillating array can have several columns and/or rows. The oscillating array can, in an embodiment, be periodic in the transversal direction and/or direction of wave propagation. However, the oscillating structures can, in principle, be distributed in any way in the direction of wave propagation of the resonator, i.e., their position and distance to the adjacent oscillating structure can be chosen as desired. The oscillating structures can additionally differ with regard to their width, length, height, material and/or layer-wise construction.

The oscillating structures that follow one another in the direction of wave propagation can, for example, be staggered in the transversal direction. The stagger can be smaller than the transversal length of the oscillating structure. The stagger can also be equal to the transversal length of the oscillating structure, where at least two rows of the oscillating structures form a checkerboard array. A distribution of the tower-like oscillating structures over the resonator surface such that there are no gaps in the direction of wave propagation that are greater in length than one wavelength has the advantage that overall (in the transversal direction), a homogeneous propagation of the wave results.

The oscillating structures can each be arranged at least partially on one of the electrode strips. The oscillating structures can also be arranged at least partially between the electrode strips. However, the base surface of the relevant oscillating structure need not project beyond the electrode strips or beyond the intermediate space between two adjacent electrode strips.

The oscillating structures can, in principle, contain any material, for example, a metal, a metal alloy or a plastic. Polymers that can be photostructured, such as the material SU-8, are suited for this. This material is based on a novolak-epoxy resin, which contains multifunctional bisphenol A and a photoinitiator as hardener. Polymer materials that can be metallized are usable for the oscillating structures.

The oscillating structures can each have two or more layers. The material of the uppermost layer may have a higher density than the material of an underlying layer of the relevant oscillating structure. With this, the sensor effect can be enhanced.

The freely oscillating oscillating structures have a high oscillation amplitude in a certain oscillation frequency range, which lies around the resonance frequency. An oscillation amplitude plotted against frequency is called the resonance curve.

The quality of the oscillation resonance, i.e., the maximum oscillation amplitude and the bandwidth at half height of a resonance curve, can be adjusted by selecting mechanical parameters of the oscillating structures as the width, length, height, mass, sequence of layers, etc. The bandwidth at half value may be chosen so that the preset operating frequency range for the sensor is within this bandwidth.

The oscillating structures can have at least one layer that is not electrically conductive. The nonconductive layer can be the bottom layer of the layer sequence of an oscillating structure, which is arranged between the electrode strips.

The oscillating structures can also have at least one layer that is electrically conductive. If the oscillation structure is arranged on the electrode strip, even the bottom layer of the layer sequence of the oscillating structure can be electrically conductive.

An adhesive layer that provides good adhesion between the substrate or the electrode strip and the oscillating structure is suitable as the bottom layer of the layer sequence of the oscillating structure.

The oscillating structures can be generated in a lithographic process. Electrically conductive oscillating structures can be produced in an electroplating process.

The oscillating structures can also be produced by the LIGA technique. LIGA stands for Lithographie-Galvano-form-Abformung, which translates to lithography, electroplating, molding.

The sensor can have at least one additional resonator that is directly perpendicular to the first resonator. Three resonators that may be arranged perpendicular to one another are provided in order to register three-dimensional rotary motion.

The second resonator can, for example, serve as a reference resonator. The second resonator may be essentially made the same as the first; however, its oscillating structures, for example, may be designed differently, so that the two resonators behave differently in terms of their useful effect. By comparing the signals of the first and second resonators, it is possible to take into account side effects that, like the useful effect, i.e., the sensor rotation, affect the propagation of the acoustic wave. Side effects primarily include temperature drift or aging of the sensor.

DETAILED DESCRIPTION

Figure 1:
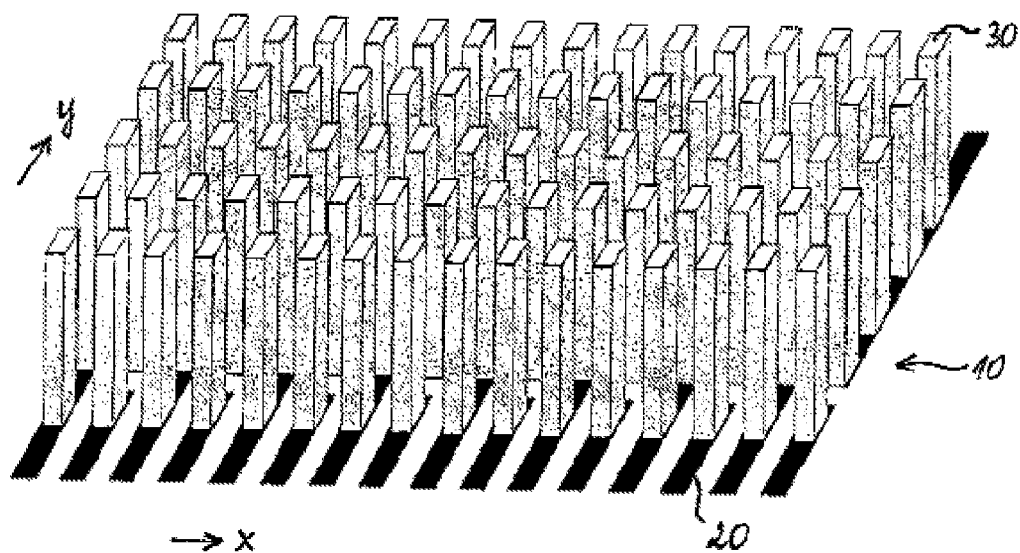
FIG. 1 shows an arrangement of oscillating structures on electrode strips of a transducer that operates with surface waves.
Figure 2:
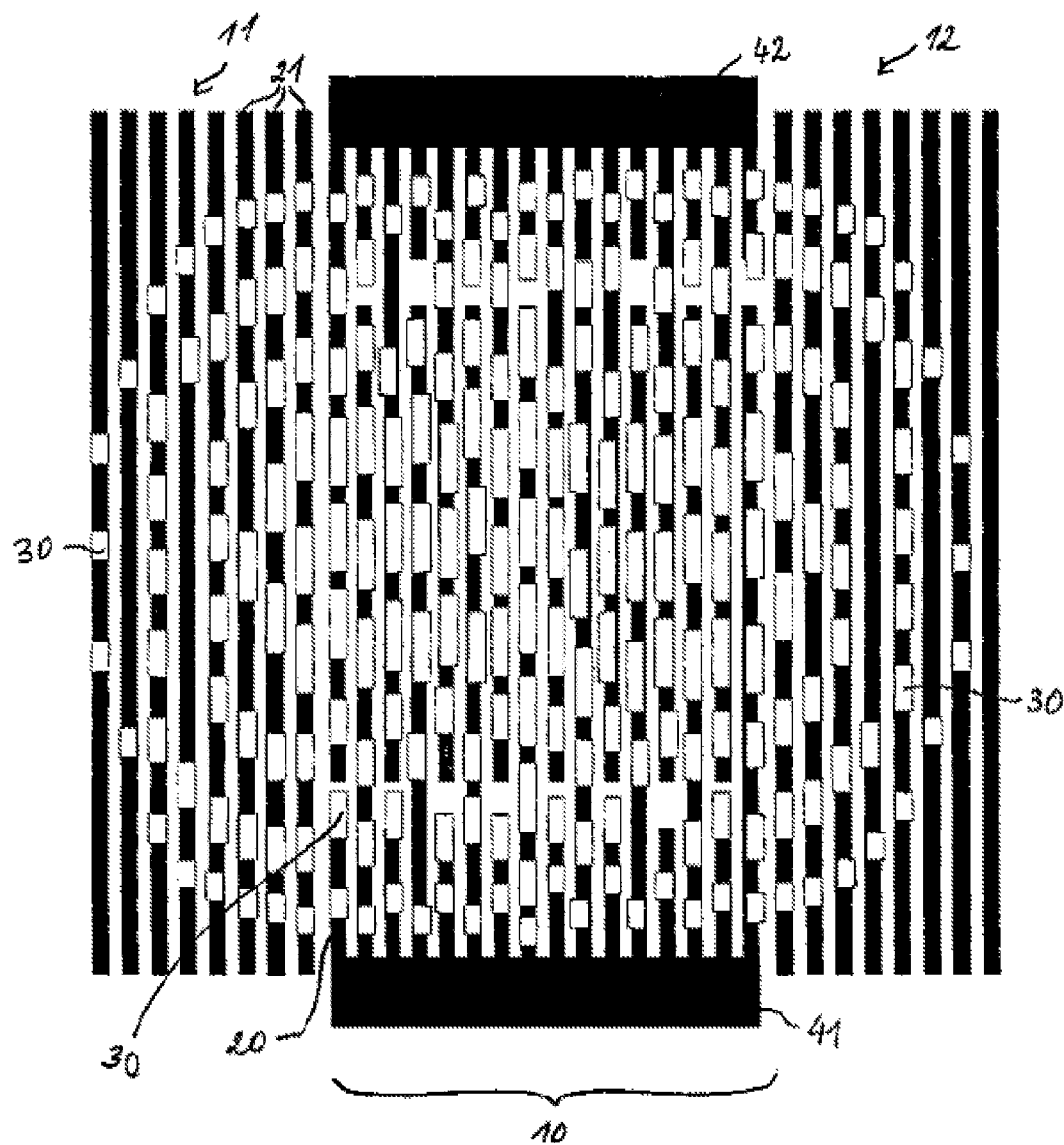
FIG. 2 shows a resonator operating with surface waves that has oscillating structures that are arranged in the region of the transducer and the reflectors.

FIGS. 1 and 2 each show an SAW resonator with a transducer 10 in sectional view. The transducer 10 has electrode strips 20, which extend in the transversal direction y. The electrode strips 20, as indicated in FIG. 2, are connected, e.g., alternatingly, to bus bars 41 and 42. An acoustic wave is stimulated between two electrode strips with different polarities and propagates in wave propagation direction x, i.e., perpendicular to the electrode strip.

Transducer 10 is arranged between reflectors 11 and 12. Each reflector has reflector strips 21, which may have essentially the same width and arrangement as the electrode strips.

Tower-like oscillating structures 30 are arranged on the electrode and reflector strips. The oscillating structures 30 can also be arranged between the electrode or reflector strips.

The oscillating structures 30 in the configuration shown in FIG. 1 form a regular arrangement with columns and rows. However, as pointed out in FIG. 2, they can be arranged in any way in the resonator.

The resonator can have different resonator regions that have different properties with regard to the oscillating structures. This can be important for matching the resonator structure to the wave profile of the stimulated wave. By dividing the resonator into resonator regions that have different properties with respect to the oscillating structures, a wave guide can be created.

The resonator has an acoustic trace in which the wave propagates. The acoustic trace can be divided into parallel partial traces. The partial traces can then be seen as transversal resonator regions.

The oscillating structures that belong to different resonator regions can, for example, have different transversal lengths from each other. They can also have different heights. The oscillating structures can include different materials or have layer sequences that differ from each other. The density of arrangement of oscillating structures can be different in different resonator regions. There may be a higher density of oscillating structures in the central region than in the edge regions.

Smaller oscillating structures may be used in the transversal edge regions of the resonator than in the inwardly lying regions of the resonator. A smaller height and/or transversal length may be chosen for the oscillating structures here than is chosen in the inwardly lying resonator regions. In a variation, a lower density in the arrangement of oscillating structures is used in the transversal edge regions of the resonator than is used in the inner resonator regions. The oscillating structures in this case can be chosen to be smaller in the edge regions than in the inner regions. In this way, a higher propagation velocity can be achieved in the edge regions than in the inner regions, which is advantageous for the formation of a waveguide in the sense of matching the stimulation profile to the wave profile that is to be achieved.

The oscillating structures 30 in the variation in FIG. 2 are each arranged partly on the electrode and reflector strips and partly between them. Larger, e.g., longer structures are situated in the central resonator region, and smaller, e.g., shorter oscillating structures are situated in the transversal and/or longitudinal edge region of the resonator.

What is claimed is:

1. A rotating motion sensor comprising:
an electroacoustic resonator comprising a transducer, the transducer comprising a piezoelectric substrate and an array of electrode strips on the piezoelectric substrate, the electroacoustic resonator to stimulate a surface acoustic wave, the electroacoustic resonator comprising oscillating structures configured to oscillate in one or both of: (i) a first direction that is along a direction of propagation of the surface acoustic wave, and (ii) a second direction that is transverse to the direction of propagation of the surface acoustic wave, at least part of the oscillating structures being on the electrode strips and/or between the electrode strips;
wherein the electroacoustic resonator is configured so that rotation of the electroacoustic resonator about an axis of rotation causes a change in resonance frequency of the electroacoustic resonator.

2. The rotating motion sensor of claim 1, wherein the oscillating structures are tower-shaped.

3. The rotating motion sensor of claim 1, wherein the oscillating structures extend further in the first direction than in the second direction.

4. The rotating motion sensor of claim 1, wherein each of the oscillating structures has a height of at least $\lambda$, where $\lambda$ is a wavelength of the surface acoustic wave.

5. The rotating motion sensor of claim 1, wherein the surface acoustic wave is a shear wave.

6. The rotating motion sensor of claim 1, wherein the surface acoustic wave is a Rayleigh wave.

7. The rotating motion sensor of claim 1, wherein, in the second direction, at least some of the oscillating structures are arranged linearly.

8. The rotating motion sensor of claim 1, wherein each of the oscillating structures comprises at least two layers, the at least two layers comprising an upper layer and a lower layer, the upper layer being further from a substrate below the oscillating structures than the lower layer; and
wherein the upper layer comprises a first material and the lower layer comprises a second material, the first material having a higher density than the second material.

9. The rotating motion sensor of claim 1, wherein oscillation of the oscillating structures is characterized by a resonance curve; and
wherein an operating frequency range for the rotating motion sensor is within a bandwidth that substantially corresponds to a half height of the resonance curve.

10. The rotating motion sensor of claim 1, wherein at least two of the oscillating structures have different geometries.

11. The rotating motion sensor of claim 1, wherein the oscillating structures comprise at least one layer that is not electrically conductive.

12. The rotating motion sensor of claim 1, wherein the oscillating structures comprise at least one layer that is electrically conductive.

13. The rotating motion sensor of claim 1, wherein the electroacoustic resonator is configured so that rotation of the electroacoustic resonator about an axis of rotation causes a change in propagation velocity of the surface acoustic wave.

14. The rotating motion sensor of claim 1, wherein the oscillating structures have mechanical parameters that are designed to define a maximum oscillation amplitude of the electroacoustic resonator.

15. The rotating motion sensor of claim 1, wherein the different regions comprise an inner region and an edge region; and
wherein the edge region has a lower density of oscillating structures than does the inner region.

16. The rotating motion sensor of claim 15, wherein the rotating motion sensor comprises different regions;
wherein there are different densities of oscillating structures in the different regions.

17. A rotating motion sensor comprising:
at least one electroacoustic resonator to stimulate a surface acoustic wave, the at least one electroacoustic resonator comprising:
oscillating structures configured to oscillate in one or both of: (i) a first direction that is a direction of propagation of the surface acoustic wave, and (ii) a second direction that is transverse to the direction of propagation of the surface acoustic wave;

wherein the at least one electroacoustic resonator is configured so that rotation affects operation of the at least one electroacoustic resonator;
wherein at least two of the oscillating structures have different geometries;
wherein at least two of the oscillating structures comprise different layer structures; and
wherein the at least one electroacoustic resonator comprises different regions, the different regions comprising different densities of oscillating structures.

18. A rotating motion sensor comprising:
at least one electroacoustic resonator to stimulate a surface acoustic wave, the at least one electroacoustic resonator comprising oscillating structures configured to oscillate in one or both of: (i) a first direction that is along a direction of propagation of the surface acoustic wave, and (ii) a second direction that is transverse to the direction of propagation of the surface acoustic wave;
wherein each of the oscillating structures comprises at least two layers, the at least two layers comprising an upper layer and a lower layer, the upper layer being further from a substrate below the oscillating structures than the lower layer;
wherein the upper layer comprises a first material and the lower layer comprises a second material, the first material having a higher density than the second material; and
wherein the at least one electroacoustic resonator is configured so that rotation of the at least one electroacoustic resonator about an axis of rotation causes a change in resonance frequency of the at least one electroacoustic resonator.

19. A rotating motion sensor comprising:
at least one electroacoustic resonator to stimulate a surface acoustic wave, the at least one electroacoustic resonator comprising oscillating structures configured to oscillate in one or both of: (i) a first direction that is along a direction of propagation of the surface acoustic wave, and (ii) a second direction that is transverse to the direction of propagation of the surface acoustic wave;
wherein the at least one electroacoustic resonator is configured so that rotation of the at least one electroacoustic resonator about an axis of rotation causes a change in resonance frequency of the at least one electroacoustic resonator;
wherein oscillation of the oscillating structures is characterized by a resonance curve; and
wherein an operating frequency range for the rotating motion sensor is within a bandwidth that substantially corresponds to a half height of the resonance curve.

* * * * *

UNITED STATES PATENT AND TRADEMARK OFFICE
CERTIFICATE OF CORRECTION

PATENT NO. : 8,393,214 B2
APPLICATION NO. : 12/438251
DATED : March 12, 2013
INVENTOR(S) : Werner Ruile and Anton Leidl It is certified that error appears in the above-identified patent and that said Letters Patent is hereby corrected as shown below:

In the Claims

Column 6, Claim 15, Line 50;

Delete "The rotating motion sensor of claim 1, wherein the different regions comprise an inner region and an edge region; and wherein the edge region has a lower density of oscillating structures than does the inner region." and Insert -- The rotating motion sensor of claim 1, wherein the rotating motion sensor comprises different regions;

wherein there are different densities of oscillating structures in the different regions. --

Column 6, Claim 16, Line 55;

Delete "The rotating motion sensor of claim 15, wherein the rotating motion sensor comprises different regions;

wherein there are different densities of oscillating structures in the different regions." and Insert -- The rotating motion sensor of claim 15, wherein the different regions comprise an inner region and an edge region; and wherein the edge region has a lower density of oscillating structures than does the inner region. --

Signed and Sealed this
Nineteenth Day of November, 2013

Teresa Stanek Rea
*Deputy Director of the United States Patent and Trademark Office*